(12) United States Patent
Sanchez et al.

(10) Patent No.: US 11,797,062 B2
(45) Date of Patent: Oct. 24, 2023

(54) PORTABLE INFORMATION HANDLING SYSTEM WITH A MULTI-TORQUE HINGE TO SUPPORT WHITEBOARD INPUT MODE

(71) Applicant: Dell Products L.P., Round Rock, TX (US)

(72) Inventors: Anthony J. Sanchez, Pflugerville, TX (US); Michael Ellis Smith, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 4 days.

(21) Appl. No.: 17/544,357

(22) Filed: Dec. 7, 2021

(65) Prior Publication Data

US 2023/0176627 A1    Jun. 8, 2023

(51) Int. Cl.
*G06F 1/16* (2006.01)
*E05D 11/08* (2006.01)
*G06F 3/0488* (2022.01)

(52) U.S. Cl.
CPC .......... *G06F 1/1681* (2013.01); *E05D 11/084* (2013.01); *E05D 11/087* (2013.01); *G06F 1/1618* (2013.01); *G06F 3/0488* (2013.01); *E05D 2011/085* (2013.01)

(58) Field of Classification Search
None
See application file for complete search history.

(56) References Cited

U.S. PATENT DOCUMENTS

| | | | |
|---|---|---|---|
| 8,683,654 B2 | 4/2014 | Chen | |
| 9,290,976 B1* | 3/2016 | Horng | G06F 1/1618 |
| 9,292,049 B1 | 3/2016 | Woodhull et al. | |
| 10,024,092 B1 | 7/2018 | Tanner et al. | |
| 10,852,765 B2 | 12/2020 | Sanchez et al. | |
| 11,099,612 B2 | 8/2021 | Sanchez et al. | |
| 2016/0070310 A1* | 3/2016 | Holung | E05D 3/122 |
| | | | 361/679.09 |
| 2018/0363341 A1* | 12/2018 | Siddiqui | E05D 3/122 |

* cited by examiner

*Primary Examiner* — Anthony Q Edwards
*Assistant Examiner* — Rashen E Morrison
(74) *Attorney, Agent, or Firm* — ZAGORIN CAVE LLP; Robert W. Holland

(57) ABSTRACT

A portable information handling system includes a variable torque hinge that increases torque to resist hinge rotation when the information handling system housing rotates to a writing position, such as rotation to a range of between 300 and 350 degrees. In one embodiment, a sequential hinge rotates in the writing range about one axle that has increased friction in the desired writing range generated by a cam having a variable surface area and depth to work a variable friction between a friction structure and axle end cap.

19 Claims, 7 Drawing Sheets

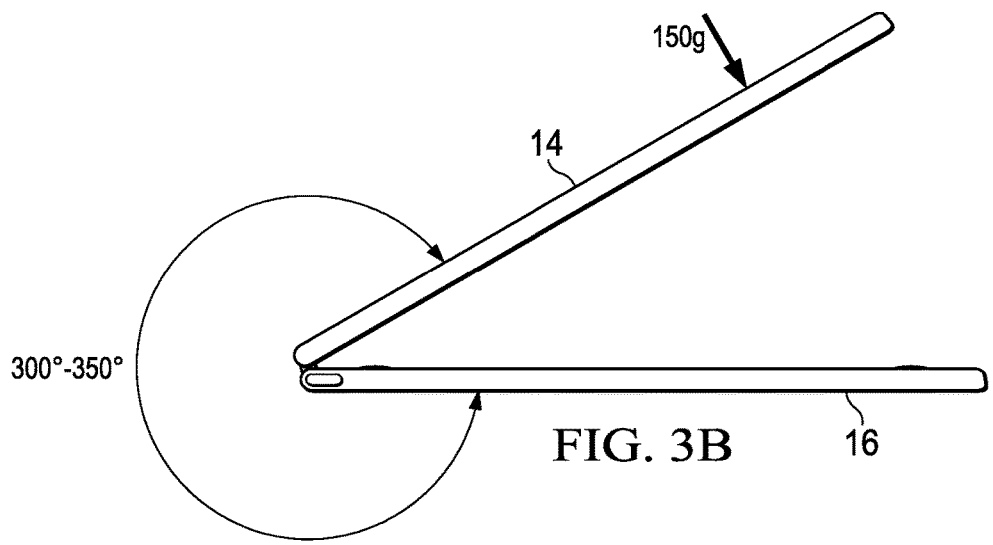
FIG. 3B
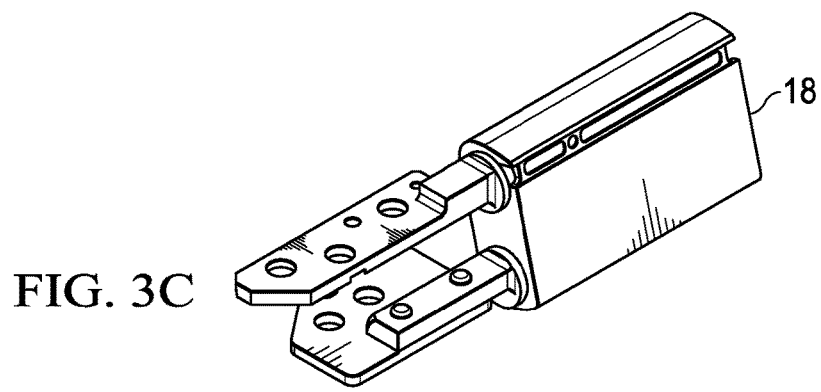
FIG. 3C
FIG. 3D
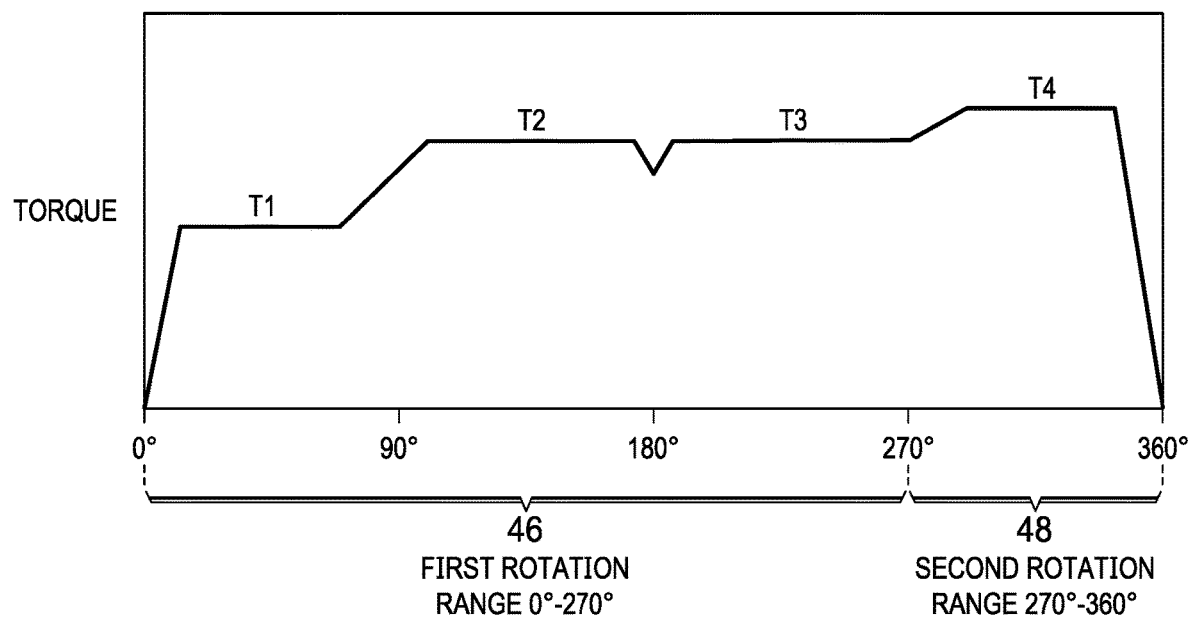

PORTABLE INFORMATION HANDLING SYSTEM WITH A MULTI-TORQUE HINGE TO SUPPORT WHITEBOARD INPUT MODE

BACKGROUND OF THE INVENTION

Field of the Invention

The present invention relates in general to the field of portable information handling systems, and more particularly to a portable information handling system with a multi-torque hinge to support a whiteboard mode of inputs.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that rotationally couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to a closed position that protects the keyboard and display, thus reducing the system footprint for improved storage and mobility.

Generally, end users tend to prefer light weight portable information handling systems that are convenient to carry and use when mobile. The length and width of a portable information handling system is typically driven by the size of the display that is integrated in the housing. Once a display size is selected, reducing weight of the system is provided by reducing the Z-height or thickness of the housing. Very low-profile information handling systems tend to have tight specifications for component placement so that optimal processing performance is available without violating thermal constraints. In particular, convertible information handling systems not only struggle to meet processing and thermal constraints but also have to include robust housings that withstand rotational forces between closed and open positions. For these reasons, the hinges that rotationally couple main and lid housing portions tend to have a robust design. A typical hinge provides synchronous rotation with dual axles translating rotation through gears or sequential rotation with separate rotation about each of the dual axles in sequence. The size of the hinge is often constrained in height by the Z-height of the housing and the amount of space available at the housing rear. For example, the rear side of the housing often includes thermal solutions to vent heated air and ports to support power and communication cable connections. In some instances, the hinges also include variable torque in which the amount of force needed to rotate the housing changes as the housing rotational orientation changes. For example, a reduced torque for the first 10 degrees of rotation makes opening the housing simpler by allowing a single hand to grasp the lid housing portion and rotate up while the weight of the main housing portion keeps the system main portion on a support surface. Increased torque after the initial opening helps to ensure that the housing maintains an open position during use unless an end user applies a rotational force.

One popular feature of portable information handling systems is the ability to write at the touchscreen display as if writing on a piece of paper. For instance, an end user writes or draws with a stylus device that has an active tip detected by the capacitive touchscreen of the display. Some convertible information handling systems rotate the lid housing portion 360 degrees to a tablet configuration having the touchscreen display exposed and the keyboard at the bottom of the system to act as a support surface. In this tablet configuration the end user can write and draw on the display as if on a thick sheet of paper. In addition, by rotating the lid housing portion greater than 270 degrees but less than a full 360 degrees, visual images at the display are presented in a "whiteboard" mode where the display is inclined relative to the user for more comfortable reading of presented information.

SUMMARY OF THE INVENTION

Therefore, a need has arisen for a system and method which provides a variable torque mode to support writing at a portable information handling system display in a whiteboard mode.

In accordance with the present invention, a system and method are provided which substantially reduce the disadvantages and problems associated with previous methods and systems of accepting end user writing inputs at a portable information handling system touchscreen display. A variable torque hinge increases torque working against rotation of a housing when the housing is in a writing rotational range so that writing inputs to the display do not rotate the housing.

More specifically, a portable information handling system processes information with processing components disposed in a portable housing having a main housing portion rotationally coupled to a lid housing portion by a variable torque hinge. A touchscreen display integrated in the lid housing portion accepts touch inputs as writing and/or drawing inputs, such as inputs by a finger or a stylus. The variable torque hinge has a first torque over a first range of housing portion rotation that maintains the housing portions in a rotational orientation when a rotational force is not applied by an end user, while allowing rotation with a first predetermined rotational force associated with opening and closing the housing. The variable torque hinge has a second torque over a second range of housing portion rotation associated with writing in a whiteboard mode, such as 300 to 350 degrees of rotation, that maintains the housing portions in the set writing rotational orientation when a force associated with writing is applied against the display. In one example embodiment, the variable torque hinge has sequential axle rotation with the writing torque provided at one axle that rotates within the writing range. A cam structure increases torque in the writing range by increasing a compression force applied against a friction structure when rotating in the writing rotational range.

The present invention provides a number of important technical advantages. One example of an important technical advantage is that a convertible portable information handling system rotates to a whiteboard mode with the housing portions in a writing rotational orientation, such 300 to 350 degrees from the closed position, and accepts writing inputs with a writing force applied against the display while maintaining the rotational orientation. A variable torque hinge increases torque needed to rotate the housing portions when in the whiteboard mode writing range by aligning a cam to compress a torque engine for increased friction working against rotation of the housing portions in the writing range. The cam produces additional torque in the writing range without increasing the size of the hinge so that the variable torque hinge will fit into a low-profile information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3A, 3B, 3C and 3D depict an example of variable torque applied at a portable information handling system housing to maintain a writing rotational position;

DETAILED DESCRIPTION

A portable information handling system rotates to a writing position at which increased torque generated at a hinge maintains the housing position against rotational force introduced by end user writing against a display surface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
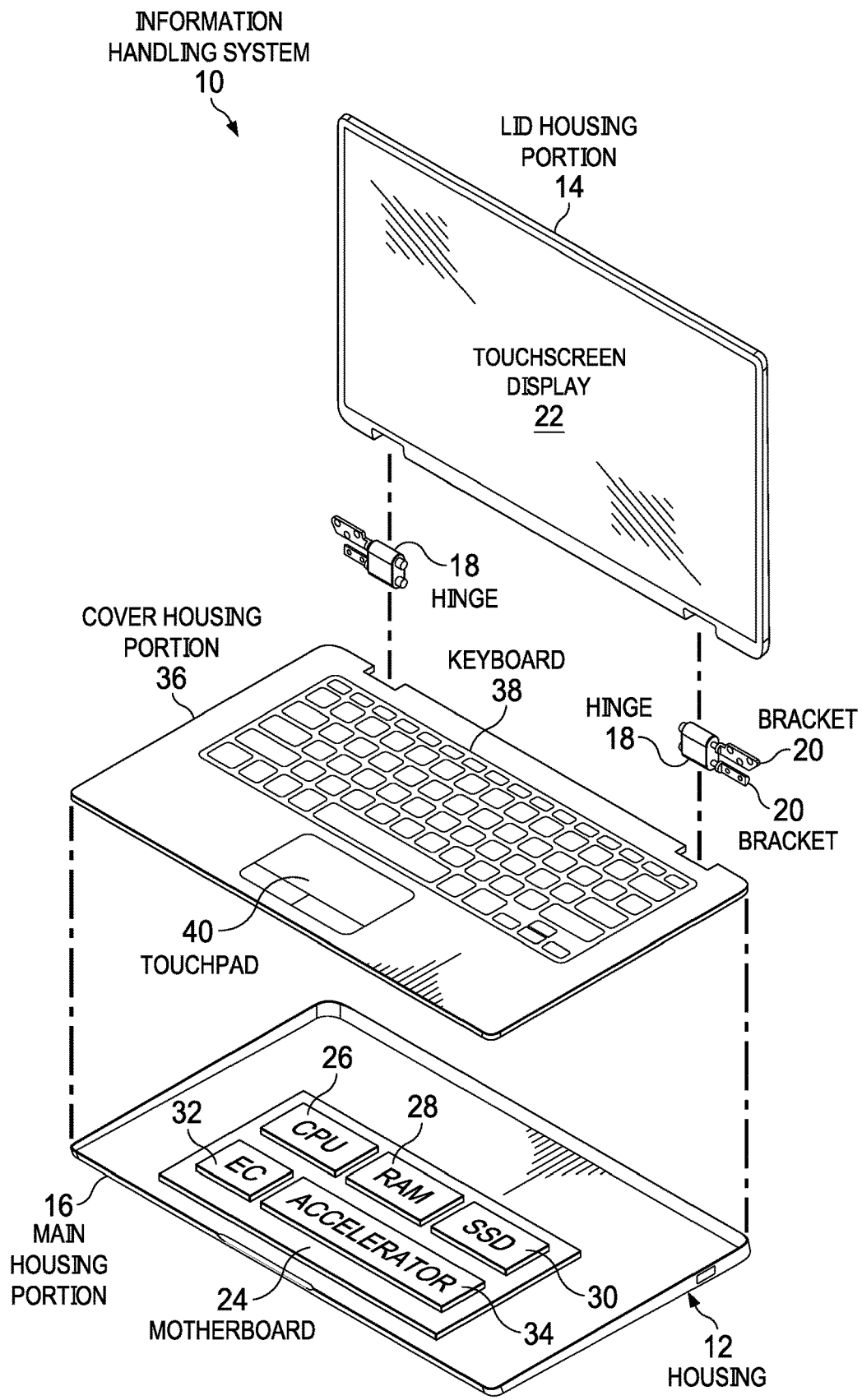
FIG. 1 depicts an exploded view of a portable information handling system having a variable torque hinge to provide a writing torque when rotated to a writing position.

Referring now to FIG. 1, an exploded view depicts a portable information handling system 10 having a variable torque hinge 18 to provide a writing torque when rotated to a writing position. In the example embodiment, portable information handling system 10 is built into a portable housing 12 having a lid housing portion 14 and main housing portion 16 rotationally coupled by a pair of hinges 18 having brackets 20. A touchscreen display 22 couples in lid housing portion 14 to present information as visual images and accept inputs as touches, such as through a capacitive touch sensor surface. A motherboard 24 coupled to main housing portion 16 interfaces processing components that cooperate to process information. For example, a central processing unit (CPU) 26 executes instructions to process information and a random access memory (RAM) 28 stores the instructions and information. A solid state drive (SSD) 30 provides persistent storage of instructions and information during system power down, such as an operating system and applications that execute on CPU 26. An embedded controller (EC) 32 executes instructions to manage operating conditions of the information handling system, such as application of power, maintaining thermal conditions and interacting with sensors and input/output devices. For instance, an accelerometer 34 detects accelerations of housing 12 and can provide gyroscopic indications or housing orientation. A cover housing portion 36 couples over main housing portion 16 with an integrated keyboard 38 to accept key inputs and a touchpad 40 to accept touch pointer inputs. When assembled, housing 12 rotates between a closed position having display 22 against cover housing portion 36 for 360 degrees to a tablet position having display 22 exposed and keyboard 38 at a bottom side of housing 12.

Figure 2:
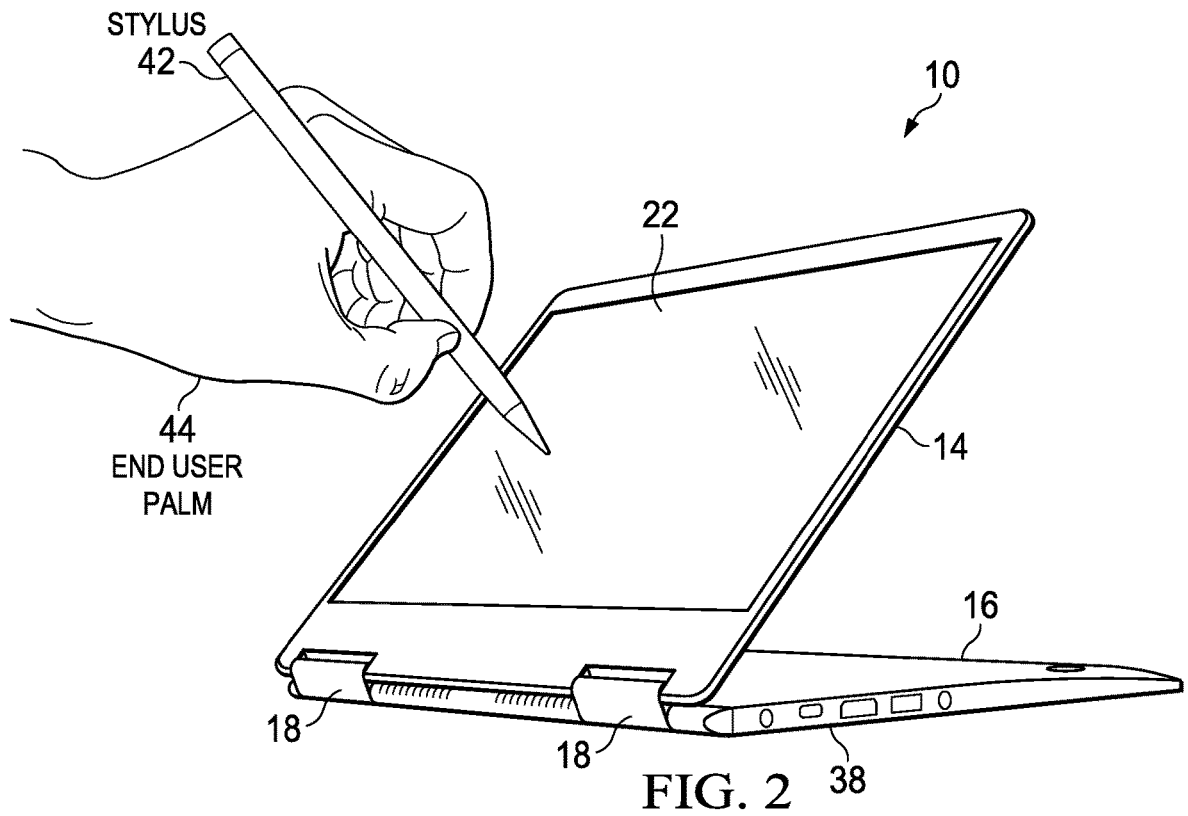
FIG. 2 depicts a side perspective view of the portable information handling system in the writing position accepting writing inputs with a stylus.

Referring now to FIG. 2, a side perspective view depicts portable information handling system 10 in the writing position accepting writing inputs with a stylus 42. The writing position has rotation past 270 degrees from the closed position so that lid housing portion 14 holds display 22 at an incline, such as that found at a writing desk. In the example embodiment, main housing portion 16 provides a base with keyboard 38 resting on a support surface so that an end user palm 44 may rest on display 22 during writing with stylus 42. When in the writing position and accepting writing inputs, hinges 18 need sufficient torque to maintain the position of lid housing portion 14 against the force of writing inputs. The torque should balance the maintenance of the selected writing position and the ability to adjust the writing position within a range of defined rotation that an end user can select for comfort. Although the example embodiment depicts a display in the lid housing portion and keyboard in the main housing portion, in alternative embodiments the keyboard may be replaced by a second display so that key inputs are made at a virtual keyboard presented at the display. As an example, information handling system 10 might have a single flexible display disposed over both housing portions that bend at hinge 18 as the housing rotates.

Figure 3A:
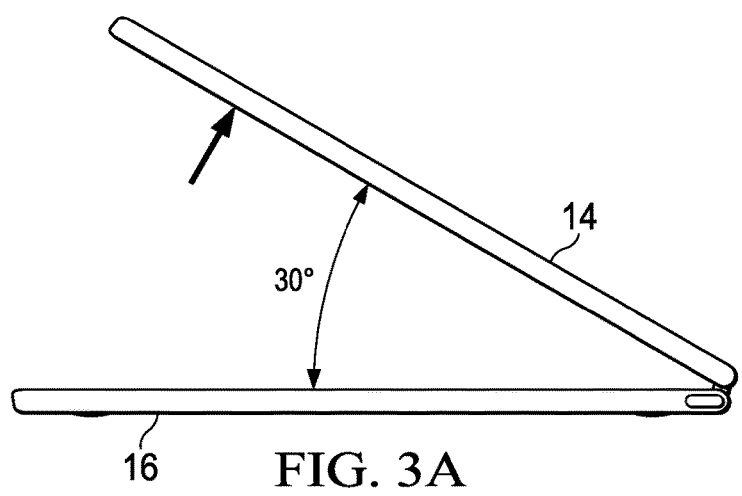

Referring now to FIGS. 3A, 3B, 3C and 3D, an example depicts variable torque applied at a portable information handling system housing to maintain a writing rotational position. Hinge 18 varies torque that works against rotation of lid housing portion 14 and main housing portion 16 based upon rotational orientation as depicted by the graph shown by FIG. 3D. During initial rotation through approximately 30 degrees as shown by FIG. 3A, torque starts with a low value that allows a one-handed opening operation and then stabilizes at a T1 value until approximately 60 degrees of rotation. Torque increases to levels T2 and T3 through the remainder of a first rotation range 46 that includes rotation from 0-270 degrees. In the first rotation range, torque generated by hinge 18 should maintain the housing rotational orientation in the absence of an end user applied rotational force and provide rotation in response to an end user rotational force that is not excessive. In a second rotation range 48, such as the 270 to 360 degree range in the example embodiment, hinge 18 provides sufficient torque to resist rotation and maintain the display position for both the weight of the display and the weight of an end user writing input at the display, such as a 150 force applied at lid housing portion 14. The additional torque does mean an end user will have to apply additional force when adjusting the rotational angle in the writing rotational range, however, the variable torque hinge limits the range at which additional force is needed to the range where a writing force is expected to be applied. In alternative embodiments, alternative ranges may be used to define the writing position, such as a degree range around 330 degrees of rotation or other similar ranges. In the example embodiment, the torque increase from level T3 to level T4 starts to ramp at 270 degrees of rotation so that the larger T4 plateau is available for improved wear characteristics. Hinge 18 provides a sequential rotation so that one axle is rotated in the second rotation range. In alternative embodiments, a more narrow writing range may be used, such as a 10 degree range around 345 degrees or other ranges that end user's prefer. Further, in an alternative embodiment a synchronous hinge may control torque at both axles.

Figure 4A:
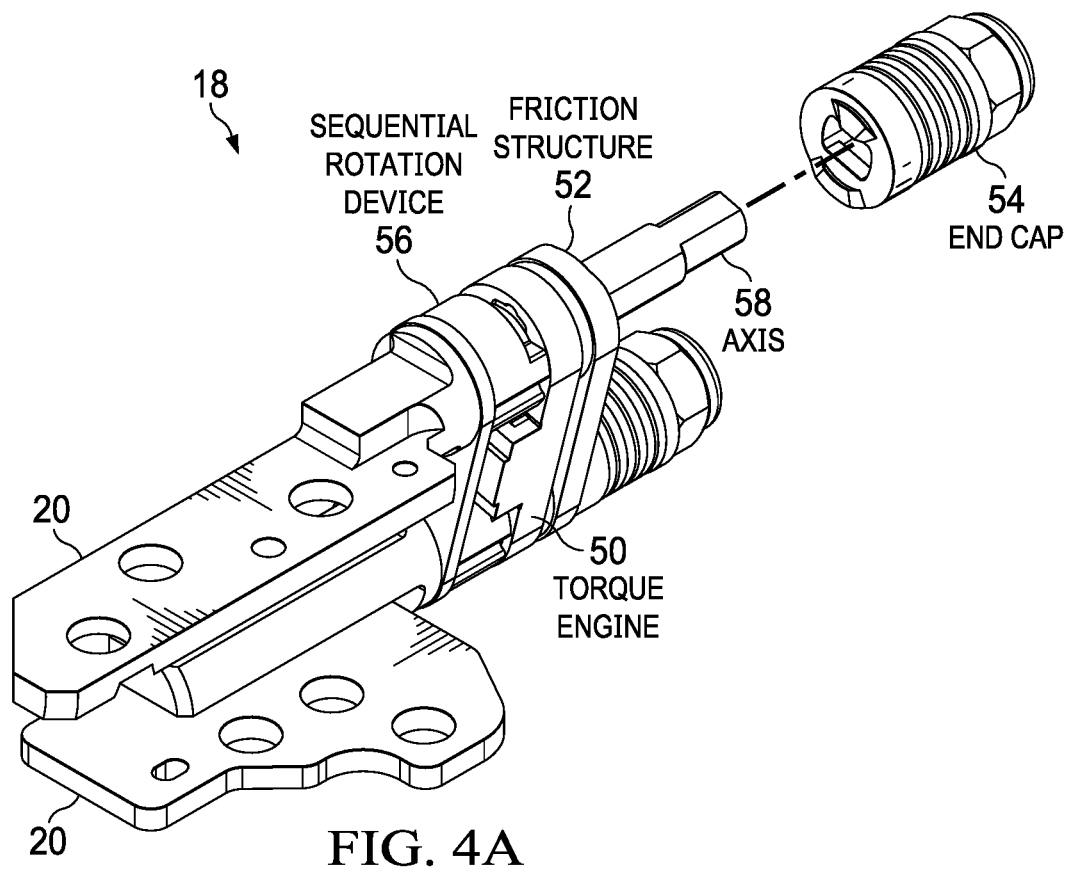
FIGS. 4A, 4B, 4C, 4D and 4E depict an example embodiment of a variable torque hinge providing a writing rotational position torque with a cam surface between a friction structure and end cap of one axle.
Figure 4B:
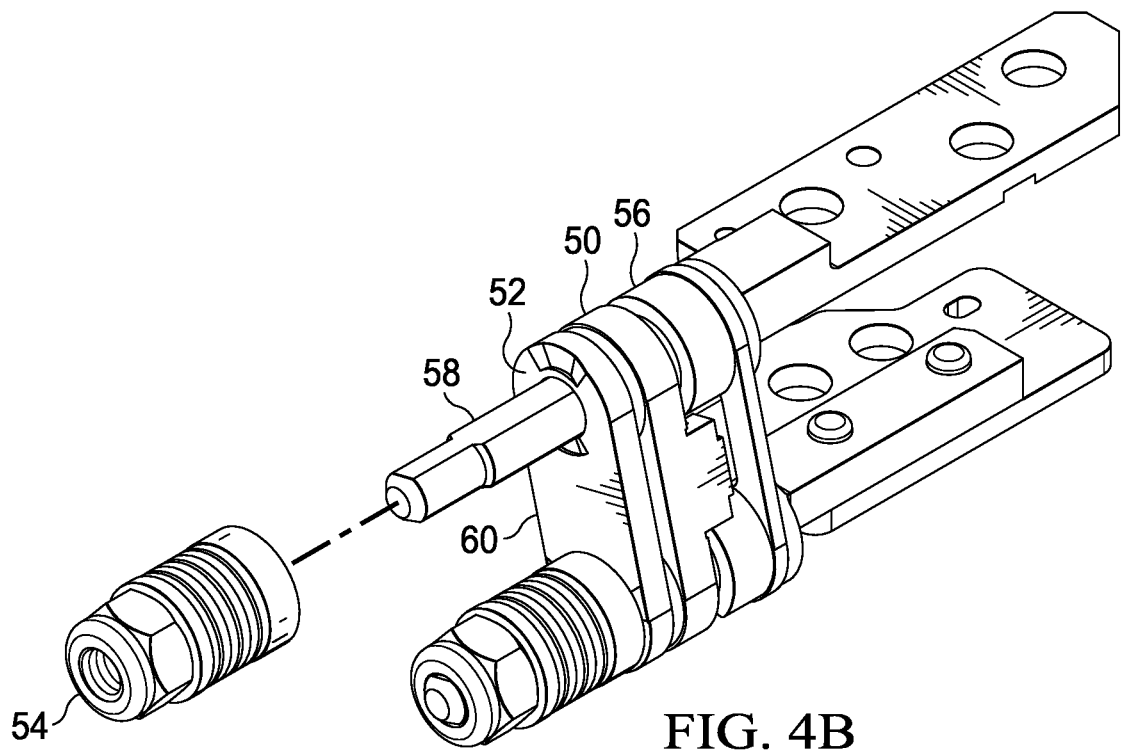

Referring now to FIGS. 4A, 4B, 4C, 4D and 4E, an example embodiment depicts a variable torque hinge 18 providing a writing rotational position torque using a cam surface 60 between a friction structure 52 and end cap 54 of one axle 58. FIG. 4A depicts an outer housing perimeter perspective view of hinge 18 with first and second brackets configured to couple to first and second housing portions. FIG. 4B depicts an interior housing perspective view of hinge 18 with end caps 54 configured to couple to each axle 58 and against a friction structure 52 so that rotation of an axle 58 generates torque that resists rotational movement of the housing portions. In the example embodiment, hinge 18 includes a sequential rotation device 56 to coordinates rotation of axles 58 in a sequential manner so that one axle 58 rotates at a time, i.e., the axles rotate in sequential order.

An advantage of a sequential rotation of axles 58 is that only one axle rotates in the writing rotation range so that the writing torque is provided with friction acting against the one axle. In an alternative embodiment, a synchronizing rotation device may be used, such as gears coupled between axles 58 to transfer rotation between the axles for synchronized rotation of the axles, i.e., simultaneous rotation of both axles. Generating torque at each axle reduces the overall torque that any axle has to produce but can increase the hinge size so that the gears are sufficiently robust to translate rotation without exceeding structural constraints.

Figure 4C:
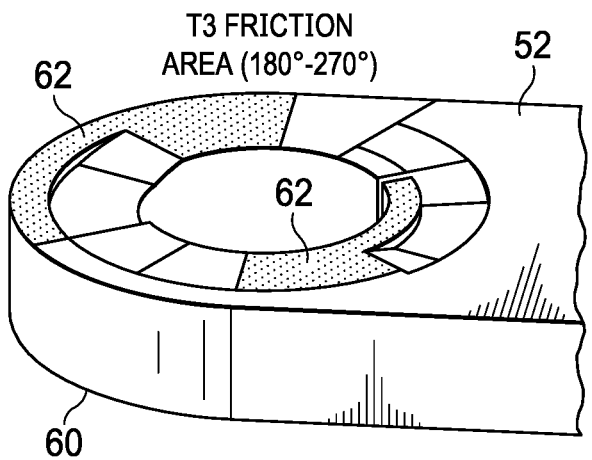
Figure 4D:
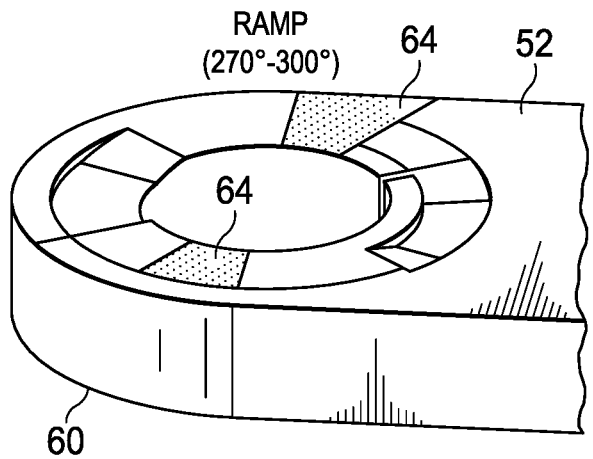
Figure 4E:
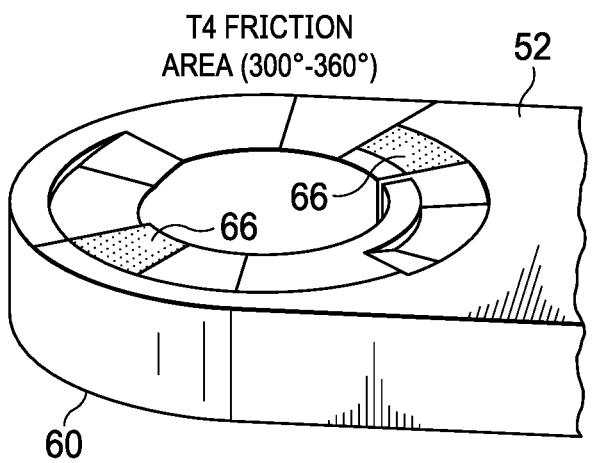

In the example embodiment, friction that generates torque to resist rotation of hinge 18 is provided by torque engine 50 that couples to axles 58. Torque engine 50 includes a friction structure 52 fit over both axles 58 so that each axle 58 rotates within and relative to friction structure 52. An end cap 54 couples in a fixed position over each axle 58 to rotate with the axle rotation and is tightened to compress against friction structure 52 so that friction between the base of end cap 54 and the surface of friction structure 52 resists rotation of axle 58. A nut on the end of end cap 54 allows adjustment of the amount of friction created with tightening of the nut causing end cap 54 to press more firmly against friction structure 52. To generate the variable torque that increases resistance to rotation in the writing rotational orientation range (i.e., 300 to 350 degrees from the closed position), a cam 60 is integrated in the surface of friction structure 52 where end cap 54 is in contact against friction structure 52. A larger protrusion of the cam 60 feature towards end cap 54 increases the amount of friction that resists rotation of axle 58 by increasing the compression of end cap 54 against friction structure 52. Similarly, an increase in the surface area working against rotation increases friction by increasing the contact area between end cap 54 and friction structure 52. Adjusting the size and rotational orientation of the cam feature determines how much torque is generated as the hinge rotational orientation changes. FIG. 4C depicts a cam feature 62 associated with the T3 torque range shown by the graph of FIG. 3 with rotation between 180 and 270 degrees. FIG. 4D depicts a cam feature 64 associated with the ramp increase towards the T4 torque range of FIG. 3 as rotation increases between 270 towards 300 degrees. FIG. 4E depicts a cam feature 66 associated with the T4 torque range of FIG. 3 for supporting writing position torque in the writing rotation range of 300 to 350 degrees. Each cam feature engages against the opposing base of end cap 54 as it rotates with axle 58 to change the rotational alignment between the friction structure and end cap and thereby determine the portion of the cam in contact with the end cap to generate friction that resists rotation, such a protrusion extending from the end cap. Although the example embodiment depicts the cam feature in friction structure 52, in an alternative embodiment the cam feature my be in end cap 54 or distributed between the friction structure and end cap.

Figure 5:
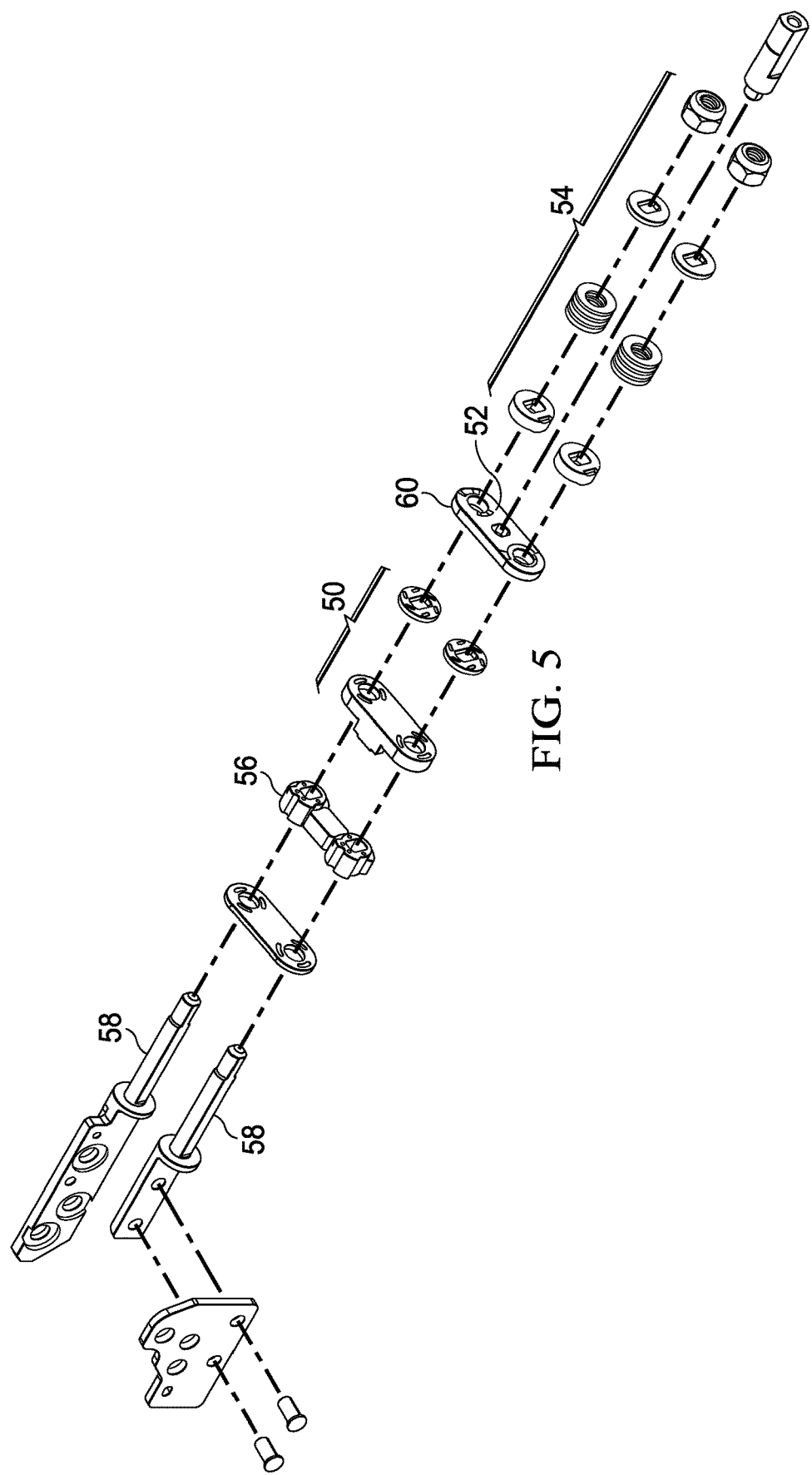
FIG. 5 depicts an exploded perspective view of the variable torque hinge.

Referring now to FIG. 5, an exploded perspective view depicts an example embodiment of the variable torque hinge 18. A pair of parallel axles 58 rotate sequentially under control of a sequential rotation device 56. Torque engine 50 holds axles 58 in parallel orientation to rotate spaced from each other and extending through friction structure 52 having the cam 60 exposed at an outer surface. End cap 54 assembles with a plurality of washers that cooperate to compress the exposed end of end cap 54 against friction structure 52, thereby generating torque in response to axle 58 rotation. In alternative embodiments, additional friction devices may be interfaced with the axles to provide torque, such as compression devices that couple over axles 58 to provide additional friction that resists rotation.

Figure 6:
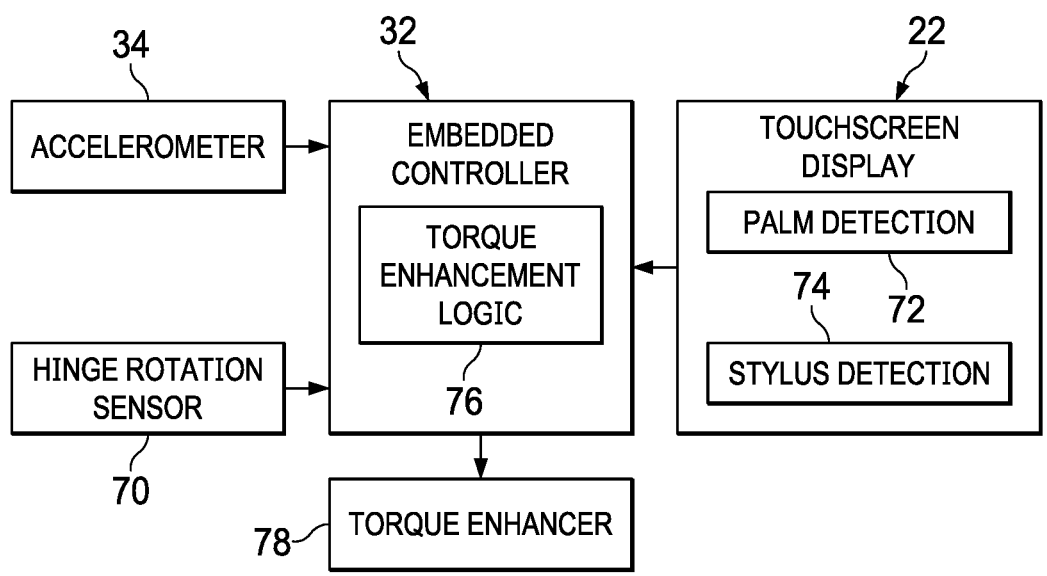
FIG. 6 depicts an alternative embodiment that provides enhanced torque when the portable information handling system rotates to a writing position and an end user writing input is detected.

Referring now to FIG. 6, an alternative embodiment is depicted that provides enhanced torque when the portable information handling system rotates to a writing position and an end user writing input is detected. In the example embodiment, context regarding information handling system housing rotational orientation and use is provided by sensors, such as accelerometer 34, hinge rotation sensor 70 and touchscreen display 22. Accelerometers 34 detect a relative orientation to gravity, such as in a gyroscopic arrangement, and movement or lack of movement. For example, gyroscopes in the separate housing portions can detect the writing rotation range, such as 300 to 350 degrees of rotation from the closed position, and accelerometers can detect a lack of movement that indicates placement of the information handling system on a support surface. Hinge position sensor 70 detects the physical position of the hinge. Touchscreen display 22 includes a palm detection logic 72 that detects palm placement on the display in a writing position, which is typically rejected as not a touch input. Stylus detection logic 74 detects a stylus touch or proximity at touchscreen display 22, which provides an indication that writing pressure will be applied against the lid housing portion. Embedded controller 32 executes a torque enhancement logic 76 that selectively activates a torque enhancer 78 to increase torque working against rotation of an axle or axles of the hinge. For example, when the writing rotation position is detected, torque enhancer 78 may be activated based upon detection of the position, based upon placement of the information handling system on a support surface, and/or based upon detection of writing inputs by palm placement or stylus placement at touchscreen display 22. Torque enhancer 78 provides additional resistance to hinge rotation when writing is detected or context indicates that writing will occur so that an end user has a more stable writing platform, yet releases when writing is completed or ceased so that the end user can change the housing rotational orientation with less torque resisting hinge rotation. Torque enhancer 78 is, for example, a solenoid or other actuator that compresses and releases a friction device against a hinge axle, such as by tightening and loosening the hinge end cap nut or bringing a separate friction device into and out of contact with the axle.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having first and second housing portions;
   a processor disposed in the housing and operable to execute instructions to process information;
   a memory disposed in the housing and interfaced with the processor, the memory operable to store the instructions and information;
   a touchscreen display coupled to the housing and operable to detect end user touches as inputs; and
   a hinge rotationally coupling the first and second housing portions, the hinge having a torque engine generating friction in response to rotation of the first and second housing portions, the friction providing torque to resist rotation of the first and second housing portions, the hinge rotating the first and second housing portions from a closed position for 360 degrees to a tablet position, the torque engine having at least a first torque and a second torque, the first torque having a first level associated with maintaining a stationary rotational orientation through a first rotation range when free of rotational force, the second torque having a second level greater than the first level and associated with maintaining a stationary rotational orientation through a second rotational range when a writing force is applied against the display, the second rotational range having the first housing portion resting on a support surface, the second housing portion elevated above the support surface at an angle and the display exposed with an upward orientation at the second housing portion to accept end user touch inputs.

2. The information handling system of claim 1 wherein the second rotational range is substantially 300 degrees to 350 degrees of rotation from the closed position.

3. The information handling system of claim 1 wherein the torque engine comprises:
   a friction structure configured to maintain a position relative to a hinge axle as the hinge axle turns;
   an axle cap that couples to the axle to turn with the axle as the first and second housing portions rotate; and
   a cam disposed between the friction structure and axle cap to increase friction in the second rotational range.

4. The information handling system of claim 1 wherein the hinge further comprises:
   a first axle coupled to the first housing portion;
   a second axle coupled to the second housing portion;
   a sequential rotation device interfaced between the first and second axles to manage sequential rotation of the first and second axles;
   a friction structure coupled between the first and second axles;
   an axle cap coupled to the first axle; and
   a cam integrated in the friction structure and aligned to increase force applied to the axle cap when in the second rotational range.

5. The information handling system of claim 1 wherein the hinge further comprises:
   a first axle coupled to the first housing portion;
   a second axle coupled to the second housing portion;
   a synchronized rotation device interfaced between the first and second axles to manage synchronized rotation of the first and second axles;
   a friction structure coupled between the first and second axles;
   a first axle cap coupled to the first axle; and
   a cam integrated in the friction structure and aligned to increase force applied to the axle cap when in the second rotational range.

6. The information handling system of claim 5 further comprising a second axle cap coupled to the second axle, the friction structure integrating a second cam aligned to increase force applied to the second axel cap when in the second rotational range.

7. The information handling system of claim 1 further comprising:
   one or more sensors operable to detect the housing rotational orientation;
   an embedded controller interfaced with the one or more sensors and configured to detect the second rotational range; and
   a torque enhancer interfaced with the hinge and the embedded controller, the embedded controller commanding enhanced torque when the housing has the second rotational range and a writing orientation.

8. The information handling system of claim 7 wherein the embedded controller commands the enhanced torque in response to a palm detected at the touchscreen display in a writing position.

9. A method for managing torque during rotation of a portable information handling system housing having first and second housing portions, the method comprising:
resisting rotation of the first and second housing portions through a first rotation range with a maintenance torque associated with maintaining a stationary rotational orientation when the first and second housing portions are free of rotational force; and
resisting rotation of the first and second housing portions through a second rotation range with a writing torque associated with maintaining a stationary rotational orientation when a writing force is applied against a display of the information handling system, the second rotation range configured to have one of the first and second housing portions resting on a support surface and the other of the first and second housing portions elevated above the support surface with the display exposed at an upper side to accept written inputs.

10. The method of claim 9 wherein the second rotational range is substantially 300 degrees to 350 degrees of rotation from a closed position.

11. The method of claim 9 further comprising:
generating the maintenance torque by friction between a hinge axle cap and a friction structure that work against each other during rotation of the hinge; and
generating the writing torque by a cam disposed between the axle cap and friction structure that engages when the hinge rotates to the second rotation range.

12. The method of claim 11 wherein:
the hinge rotates first and second axles sequentially; and
the cam generates the writing torque at only one axle of the hinge having rotation in the second rotation range.

13. The method of claim 11 wherein:
the hinge rotates first and second axles synchronously; and
first and second cams couple between the axle caps and friction structure for the first and second axles of the hinge to each generate the writing torque in the second rotation range.

14. The method of claim 9 further comprising:
sensing the second rotation range with sensors of the information handling system;
sensing a hand placement on the display in a writing position; and
in response to the second rotation range and hand placement, engaging a torque enhancer to further increase writing torque.

15. The method of claim 14 wherein the sensing the second rotation range includes sensing placement of the housing on a support structure.

16. A system for managing torque during rotation of a portable information handling system housing having first and second housing portions, the system comprising:
first and second hinges, each of the first and second hinges having first and second axles; and
a torque engine coupled to each of the first and second hinges, each torque engine having a friction structure coupled to the first and second axles and an end cap coupled to each of the first and second axles, and having a cam disposed between the friction structure and the first and second end caps to generate a first torque in a first rotation range and a second torque in a second rotation range, the first torque associated with maintaining a stationary rotational orientation through the first rotation range when free of rotational force, the second torque associated with maintaining a stationary rotation orientation through the second rotation range when a writing force is applied against the hinge, the second rotation range configured to have at least 270 degrees of rotation from a closed position with one of the first and second housing portions resting on a support surface and the other of the first and second housing portions elevated above the support surface with the display exposed at an upper side to accept written inputs.

17. The system of claim 16 wherein the second rotation range is substantially 300 degrees to 350 degrees of rotation from a closed position of the hinge.

18. The system of claim 16 further comprising:
a sequential rotation device coupled to each hinge and coordinating rotation of the one axle at a time;
wherein only the axle associated with rotation in the second rotation range has the cam that generates the second torque.

19. The system of claim 16 further comprising:
an embedded controller operable to execute instructions;
a torque enhancer interfaced with the embedded controller and at least one of the first and second hinges;
plural sensors operable to detect the second rotation range; and
non-transitory memory interfaced with the embedded controller and storing instructions that when executed on the embedded controller causes:
detection of writing at a touchscreen display of the portable information handling system when in the second rotation range; and
selective engagement of torque enhancer in response to the detection of writing.

* * * * *